United States Patent [19]

Stapleton

[11] Patent Number: 5,248,080
[45] Date of Patent: Sep. 28, 1993

[54] ARTICLES AND METHODS FOR JOINING TUBULAR ARTICLES TO ONE ANOTHER

[75] Inventor: Philip D. Stapleton, Glendale, Calif.

[73] Assignee: Stapleton Technologies, Inc., Long Beach, Calif.

[21] Appl. No.: 925,250

[22] Filed: Jul. 31, 1992

Related U.S. Application Data

[63] Continuation of Ser. No. 577,917, Sep. 5, 1990, abandoned.

[51] Int. Cl.$^5$ ............................................. B23K 31/00
[52] U.S. Cl. .................................... 228/175; 228/189; 228/254; 285/55; 285/286; 285/416
[58] Field of Search ................ 228/175, 189, 131, 132, 228/208, 216, 254, 56.3; 285/55, 286, 287, 723, 416, 329, 330

[56] References Cited

U.S. PATENT DOCUMENTS

| | | | |
|---|---|---|---|
| 2,125,324 | 8/1938 | Williams et al. | 228/216 |
| 2,224,145 | 12/1940 | Dugan et al. | 228/189 |
| 3,188,117 | 6/1965 | Press et al. | 285/55 |
| 3,223,821 | 12/1965 | Langdon | 228/216 |
| 4,326,117 | 4/1982 | Kanne, Jr. et al. | 228/175 |
| 4,765,529 | 8/1988 | Turner | 228/131 |

FOREIGN PATENT DOCUMENTS 3843921 6/1990 Fed. Rep. of Germany ...... 228/189
51-44538 4/1976 Japan .................................... 228/189

OTHER PUBLICATIONS

Metals Handbook Ninth Edition, vol. 5, "Electroless Nickel Plating", pp. 219-243, copyright 1982.

Primary Examiner—Samuel M. Heinrich

[57] ABSTRACT

An article for joining in end-to-end relationship two or more tubular articles such as pipe sections, and particularly pipe sections coated on their inner and outer surfaces with an electroless metal such as nickel and adapted for passing corrosive liquids and solids includes a ring-shaped member having a meltable coating, on its surfaces intended to engage the ends of the tubular articles and the inner surface of the tubular articles at their junction, and having a flange on its outer circumference that is of a shape and size adapted to engage and seat upon the inner surfaces of the tubular articles to be joined in end-to-end relationship. Welding material is placed in a chamfered region formed at the outer edge of two tubular articles at their ends, joining the two tubular articles in end-to-end relationship with the ring-shaped member between them, and melting the coating into the junction between those ends, and into the interface between the flange surface and the inner surfaces of the tubular articles.

20 Claims, 3 Drawing Sheets

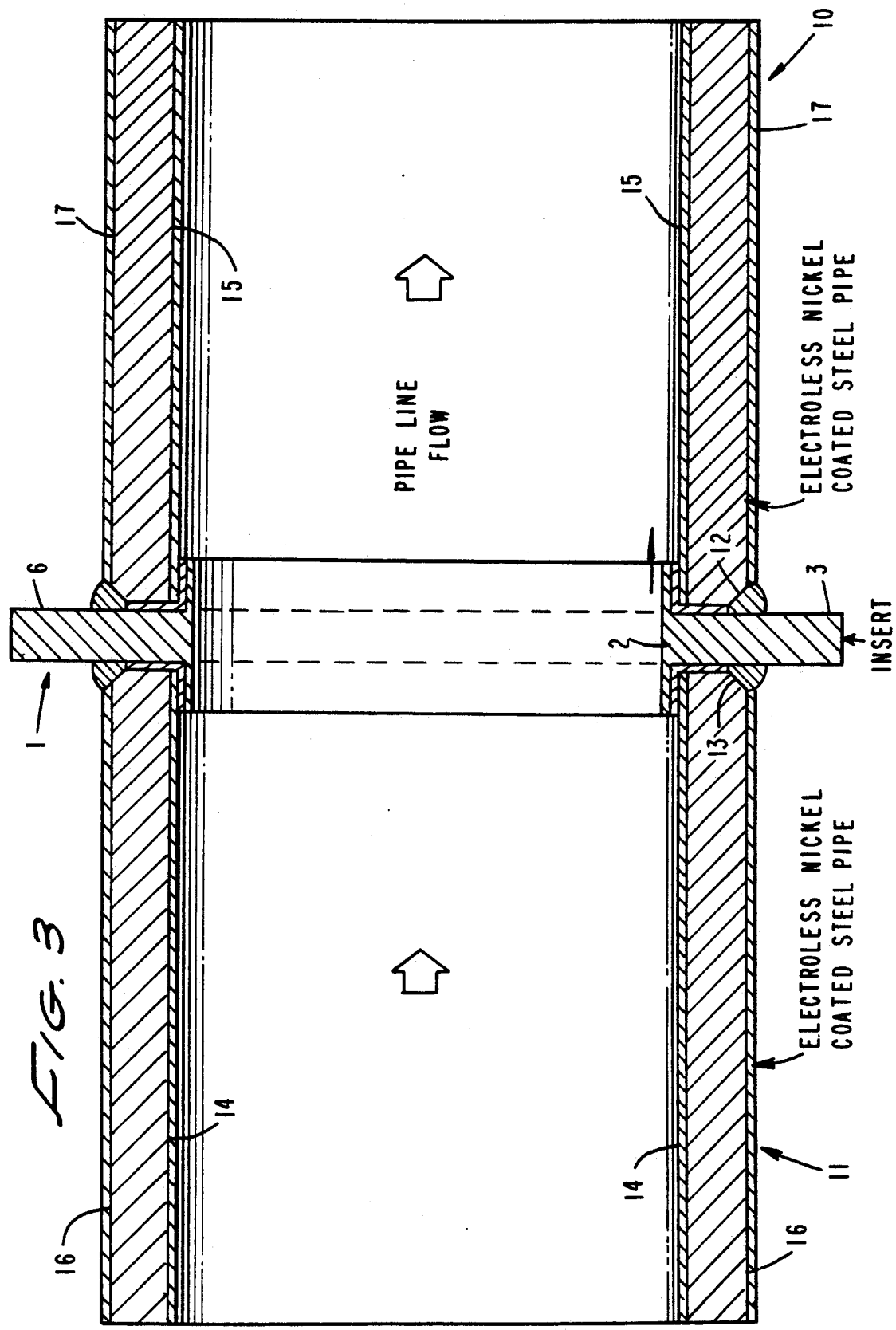

ARTICLES AND METHODS FOR JOINING TUBULAR ARTICLES TO ONE ANOTHER

This application is a continuation of application Ser. No. 07/577,917 filed Sep. 5, 1990, entitled "Articles and methods for joining tubular articles to one another" by Philip D. Stapleton, which is now abandoned.

BACKGROUND OF THE INVENTION

1. Field of the Invention

This invention relates to articles for joining two or more tubular articles to one another, and has particular application to joining two or more tubular articles that are internally coated with electroless metals, such as electroless nickel. The invention also relates to methods for joining such articles in end-to-end relationship.

2. Description of the Prior Art

Until now, tubular articles have been joined end to end by welding alone, with collars alone, or with collars and welding used together. Such techniques are ineffective in joining tubular articles to one another in end-to-end relationship where the tubular articles are subjected to severe corrosive conditions arising from the flow of corrosive liquids and gases through the tubular articles, particularly where the fluids flow at high speed.

SUMMARY OF THE INVENTION

Articles for joining tubular articles such as pipe, and particularly for joining tubular articles that have their interior surfaces coated with an electroless metal such as electroless nickel, comprise a ring-shaped member having a meltable, preferable eutectic, more preferably a eutectic metallic coating, on the surfaces of the member intended to engage the ends of the tubular articles to be joined to one another.

The ring-shaped member has an inner circumference and an outer circumference, and includes flange means on its inner circumference. The flange means has a size and shape adapted to engage, seat upon, and join to the inner surfaces of at least one of the tubular articles to be joined to one another in end-to-end relationship. The flange means has a meltable coating on its surfaces intended to engage the inner surface of the tubular member.

These coatings, on the sides of the ring-shaped member and on the surfaces of the flange means that are intended to engage the internal surfaces of the tubular member, preferably have a corrosion potential sufficient to produce minimal electrochemical potential between the ring-shaped member and the tubular articles to be joined together. The coatings are adapted to melt and flow into the junction between the tubular articles, and into the junction between the inner surface of the tubular members and the coated surfaces of the flange means.

The ring-shaped member has sufficient breadth between its inner and outer circumferences to substantially cover the wall thicknesses of the tubular articles to be joined to one another, and to extend substantially around the entire circumference of the end openings of the tubular articles.

The ring-shaped members are preferably made from an abrasion-resistant substance such as a hard nickel alloy. Other examples of such substances are: Hastelloy, Inconel, Monel and nickel alloys.

Examples of the eutectics useful for coating the sidewalls of the ring-shaped member and the undersurfaces of the flange on the ring-shaped member are tin-lead, tin-bismuth, and tin-antimony alloys and other alloy combinations of tin, lead, bismuth and antimony. These eutectics preferably have a corrosion potential which approximates the corrosion potential of the inner surfaces, or any coatings on the inner surfaces of the tubular articles. Examples of such coatings are phosphorous-containing electroless nickel coatings. Such coatings are used on stainless steel and other steel pipes used to carry corrosive liquids and/or gases such as crude oil containing sulfur dioxide and hydrogen sulfide. Preferably, these eutectic coatings also produce a minimal electrochemical potential, e.g., less than about 150 millivolts, at or near the junction between two tubular articles.

The ring-shaped member can be made in several sizes to match the differing wall thicknesses of the tubular articles to be joined together. Where the tubular articles are metal pipe, the range of ring diameter about 0.1 inch to about 20 feet. The coating thicknesses on the sidewall and flange surfaces is, in preferred embodiments, in the range about 0.2 mils to about 10.0 mils. The ring-shaped member itself is preferably made of a material which is abrasion resistant, but is susceptible to erosion where the fluids flowing through the tubular articles to be joined to one another pass over the flange.

The ring-shaped members can be of a configuration where the flange extends radially outwardly in both directions from the outer circumference of the ring-shaped member or extend outwardly to only one side of the ring-shaped member. For the latter type of ring-shaped members, the insert may include a plurality of holes in the ring itself to receive bolts or other means for joining one section of a tubular article to another with each of the sections having a ring-shaped member welded to its end surface. The holes through the ring-shaped member are preferably indexed so that they can be coincident with such holes on a second ring-shaped member of the same kind joined to a second tubular article.

The methods of this invention for joining two or more tubular articles, preferably articles having electroless metal, and more preferably electroless nickel coatings on their inner and outer wall surfaces in end-to-end relationship comprise: removing the electroless metal coating at the ends of the tubular articles to be formed to one another; forming a gap at each of the ends to receive welding substances; placing between the ends of the tubular articles a ring-shaped member of this invention, and applying welding material in the gaps on either side of the member at the ends of the tubular articles to be joined to one another to join the articles in end-to-end relationship. In the welding step, the meltable coating flows into the interface between the sidewalls of the ring-shaped member and the ends of the tubular articles, and between the surface of the flange that engages the inner wall of the tubular member and the inner wall itself on both sides of the junction between the two tubular articles so joined.

BRIEF DESCRIPTION OF THE DRAWINGS

This invention can better be understood by reference to the drawings, in which:

FIGS. 3 and 4 show two views of the ring-shaped member of FIGS. 1 and 2, with the ends of the tubular articles from FIG. 1 joined to one another by means of the member.

DETAILED DESCRIPTION OF THE PREFERRED EMBODIMENTS

Figure 1:
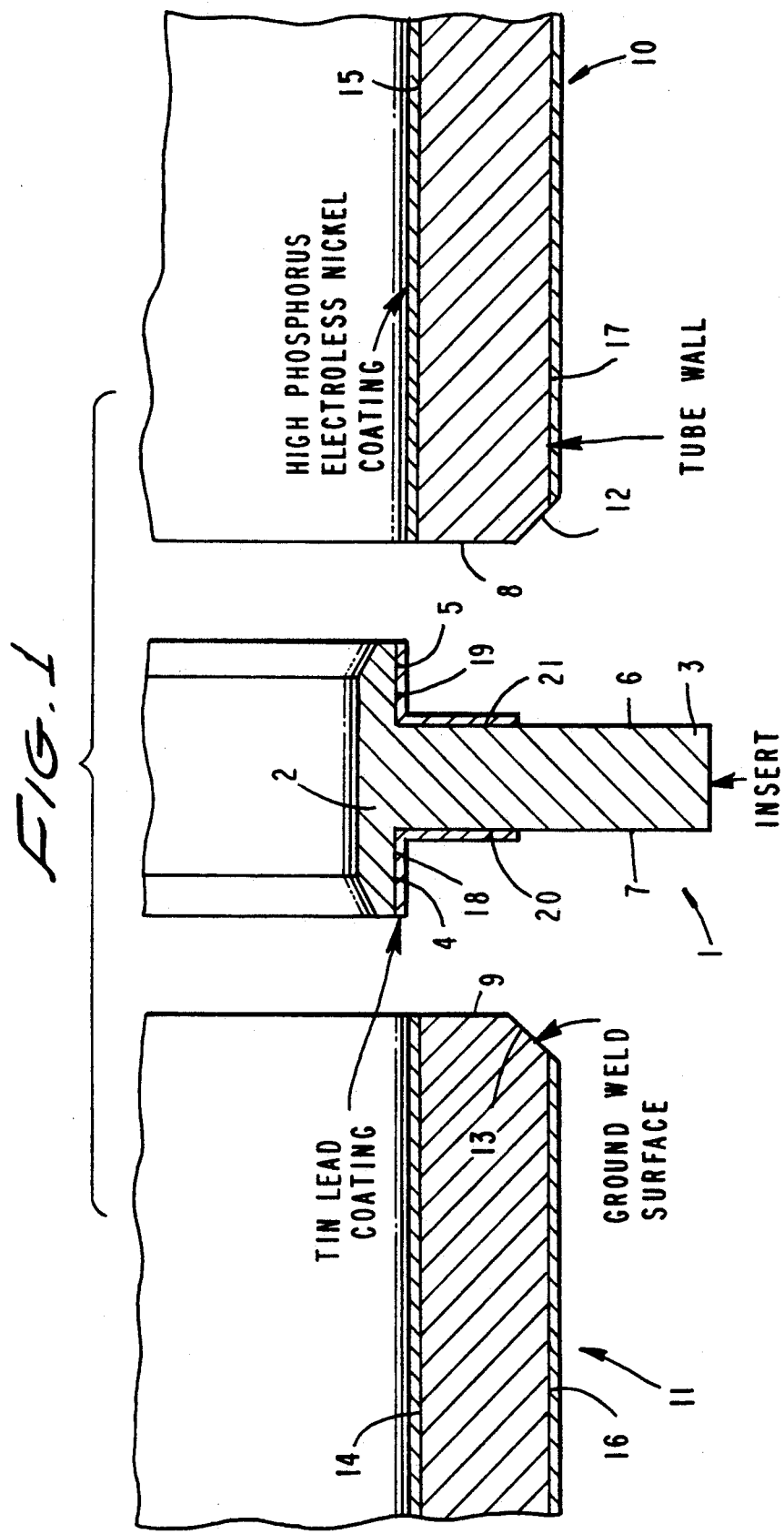
FIG. 1 shows a side view in cross-section of a preferred embodiment of the ring-shaped member of this invention.

FIG. 1 shows a side view in cross-section of ring-shaped member 1. This ring-shaped member 1 has a round hole at the center, and flange 2 attached to and integral with outer circumference 3 of member 1. Flange member 2 extends radially outwardly from both sides of ring shaped member 1, and has on its undersurfaces 4 and 5, and on its side surfaces 6 and 7, a thin coating of eutectic metal such as a tin-lead alloy. Member 1 is made of a hard nickel alloy, and has an electropotential in a chloride system for high-phosphorus electroless nickel in the range of about −250 to about −350 millivolts (mv).

Figure 2:
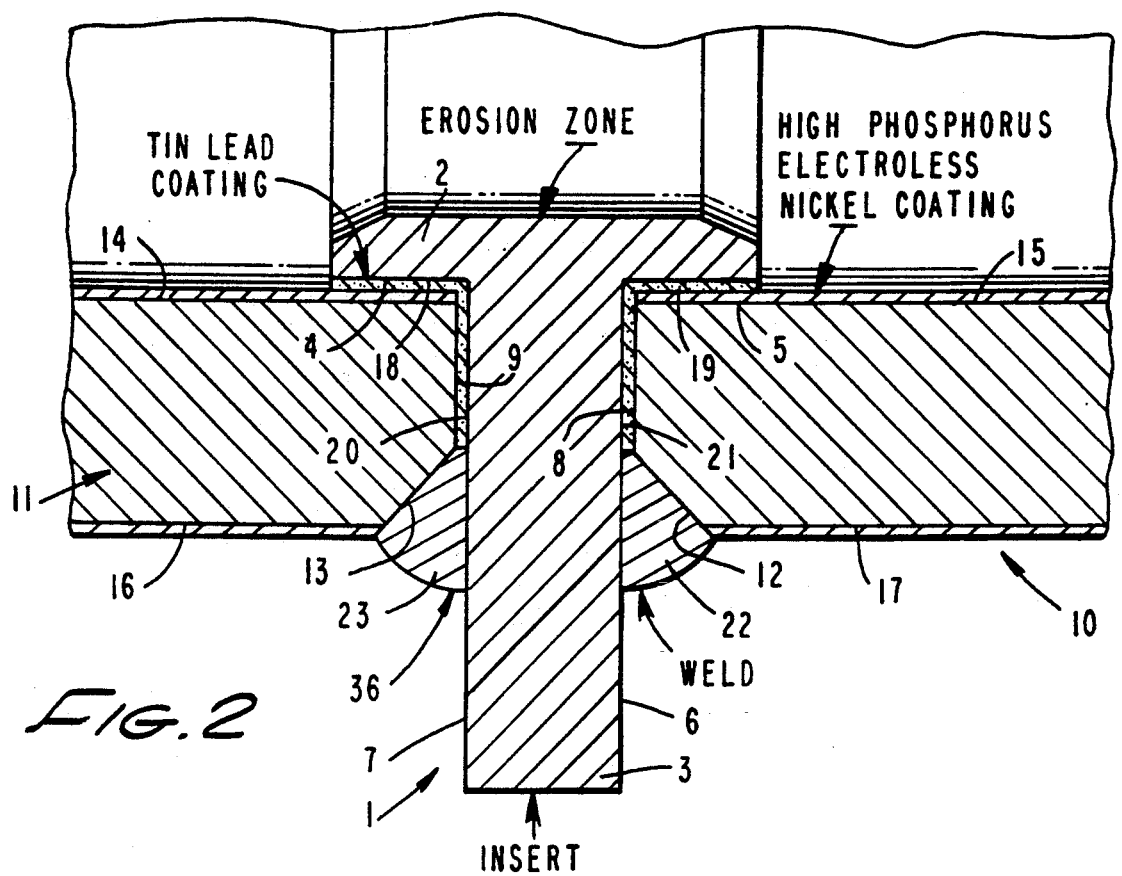
FIG. 2 shows the embodiment of FIG. 1 positioned between the ends of two tubular articles, shown in partial cross-section.

FIG. 2 shows insert 1 placed between the end walls 8 and 9 of tubular articles 10 and 11. End walls 8 and 9 have chamfered regions 12 and 13 to receive a welding substance for joining the tubular articles 10 and 11 to one another. Inner and outer surfaces 14, 15, 16, and 17, of tubular articles 10 and 11 carry a coating of phosphorus-containing electroless nickel. Flange member 2 has on its undersurfaces 18 and 19, as well as on its sidewall surfaces 20 and 21, a thin coating of a eutectic metal alloy such as tin-lead.

FIG. 3 shows tubular articles 10 and 11 joined to one another by means of welding material 22 and 23 placed circumferentially around chamfered regions 12 and 13 of pipe members 10 and 11, and which joins insert 1 to each of end walls 8 and 9 of tubular members 10 and 11. Since the welding material 36 (see also FIG. 5) is deposited in chamfered regions 12 and 13 at very high temperatures, the tin-lead eutectic coating on surfaces 20, 21, 18 and 19, melts, and then cools, fusing end walls 8 and 9 of tubular sections 10 and 11 to insert 1 and undersurfaces 18 and 19 of flange 2 to the electroless nickel coating on surfaces 15 and 14 of tubular members 10 and 11.

Figure 4:
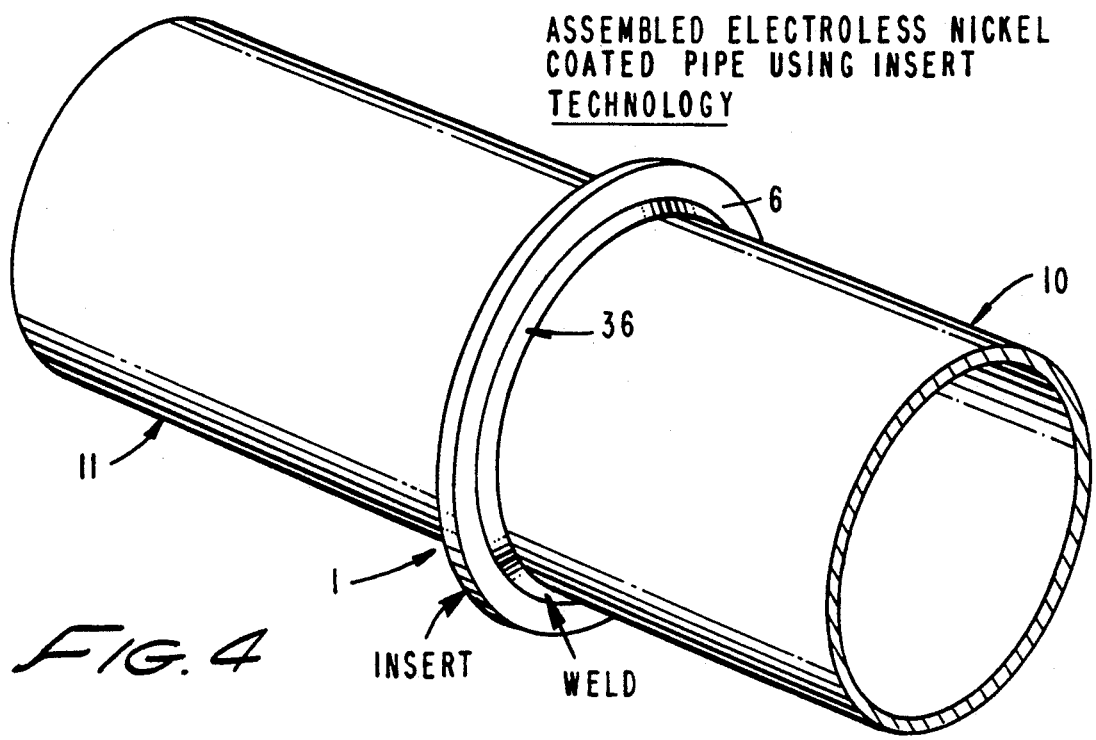

FIG. 4 shows the resulting assembly with electroless nickel-coated steel pipe members 10 and 11 joined in end-to-end relationship by member 1. Over time, corrosive fluids pass through tubular sections 10 and 11, and over the upper surface of flange 2. Flange 2 erodes until the junction between tubular articles 10 and 11 is reduced to a thin layer of nickel alloy from which the member is made, overlying a layer of eutectic such as tin-lead alloy. In turn, the eutectic overlies the electroless nickel coating on the interior surface of the tubular articles.

What is claimed is:

1. An article for joining, in end-to-end relationship, right-cylindrical shaped tubular articles that are coated with electroless metal comprises a ring-shaped member having a meltable coating on its side surfaces intended to engage the ends of said tubular articles substantially without deforming said electroless metal coating, said ring-shaped member having a diameter substantially greater than the outside diameter of said tubular articles, said ring-shaped member having flange means on its inner circumference, said flange means having a shape and size adapted to engage and seat upon the inner surfaces of two of said tubular articles placed in end-to-end relationship substantially without deforming said electroless metal coating, said flange means having a meltable coating on its surfaces intended to engage the inner surfaces of the tubular articles at their ends.

2. The article of claim 1 wherein said ring-shaped member comprises an abrasion-resistant metal alloy.

3. The article of claim 1 wherein said coating has a corrosion potential sufficient to produce minimal electrochemical potential between said ring-shaped member and said tubular articles to be joined to one another.

4. The article of claim 1 wherein said coating is adapted to melt and flow into the junction between said two tubular articles and said ring-shaped member during welding.

5. The article of claim 1 wherein said ring-shaped member has sufficient breadth between its inner and outer circumferences to substantially cover the wall thicknesses of said tubular articles around the circumferences of said tubular articles at the end openings where said tubular articles are to be joined to one another.

6. The article of claim 1 wherein said electroless metal is a phosphorus-containing alloy.

7. The article of claim 1 wherein said electroless metal is a nickel-containing alloy.

8. The article of claim 1 wherein said electroless metal is a cobalt-containing alloy.

9. The article of claim 1 wherein said ring-shaped member has a corrosion potential within 150 millivolts of the corrosion potential of said electroless metal.

10. An article comprising two or more right-cylindrical shaped tubular articles that include internal surfaces coated with electroless metal joined in end-to-end relationship by a ring-shaped member, said ring-shaped member including flange means on its inner circumference, said ring-shaped member having a diameter substantially greater than the outer diameter of said tubular articles, said flange means having a shape and size adapted to engage and seat upon the inner surfaces of two of said tubular articles placed in end-to-end relationship substantially without deforming the electroless metal coating on said tubular articles, said flange means having a meltable coating on its surfaces intended to melt and to adhere upon subsequent cooling to the inner surfaces of the tubular articles at their ends.

11. A method for joining two or more tubular articles having electroless metal-coated inner and outer wall surfaces in end-to-end relationship comprising: removing the electroless metal coating at the ends of the tubular articles; forming a gap at each of the ends of the tubular articles to be joined to one another to receive welding material; placing between said ends a ring-shaped member having a meltable coating on its side surfaces intended to engage the ends of said tubular articles, said ring-shaped member having flange means on its inner circumference; and applying welding material in the gaps between said ring-shaped member and the ends of said tubular articles to be joined in end-to-end relationship while melting the meltable coating on said ring-shaped member into the interface between the ring-shaped member and the ends of the articles to be joined to one another, and between the inner surface of the tubular articles to be joined to one another and the bottom surfaces of the flange means.

12. An article comprising two or more right-cylindrical shaped tubular articles that include internal surfaces coated with electroless metal joined in end-to-end relationship by a ring-shaped member, said ring-shaped member having a diameter substantially greater than the outside diameter of said tubular articles, said ring-shaped member including flange means on its inner circumference, said flange means having a shape and size adapted to engage and seat upon the inner surfaces of two of said tubular articles placed in end-to-end relationship substantially without deforming the electroless metal coating, said flange means having a meltable coating on its surfaces intended to melt and to adhere upon subsequent cooling to the inner surfaces of the tubular articles at their ends.

13. The article of claim 12 wherein said ring-shaped member comprises an abrasion-resistant metal alloy.

14. The article of claim 12 wherein said coating has a corrosion potential sufficient to produce minimal electrochemical potential between said ring-shaped member and said tubular articles to be joined to one another.

15. The article of claim 12 wherein said coating is adapted to melt and flow into the junction between said two tubular articles and said ring-shaped member during welding.

16. The article of claim 12 wherein said ring-shaped member has sufficient breadth between its inner and outer circumferences to substantially cover the wall thicknesses of said tubular articles around the circumferences of said tubular articles at the end openings where said tubular articles are to be joined to one another.

17. The article of claim 12 wherein said electroless metal is a phosphorus-containing alloy.

18. The article of claim 12 wherein said electroless metal is a nickel-containing alloy.

19. The article of claim 12 wherein said electroless metal is a cobalt-containing alloy.

20. The article of claim 12 wherein said ring-shaped member has a corrosion potential within 150 millivolts of the corrosion potential of said electroless metal.

* * * * *